Patented Feb. 4, 1941

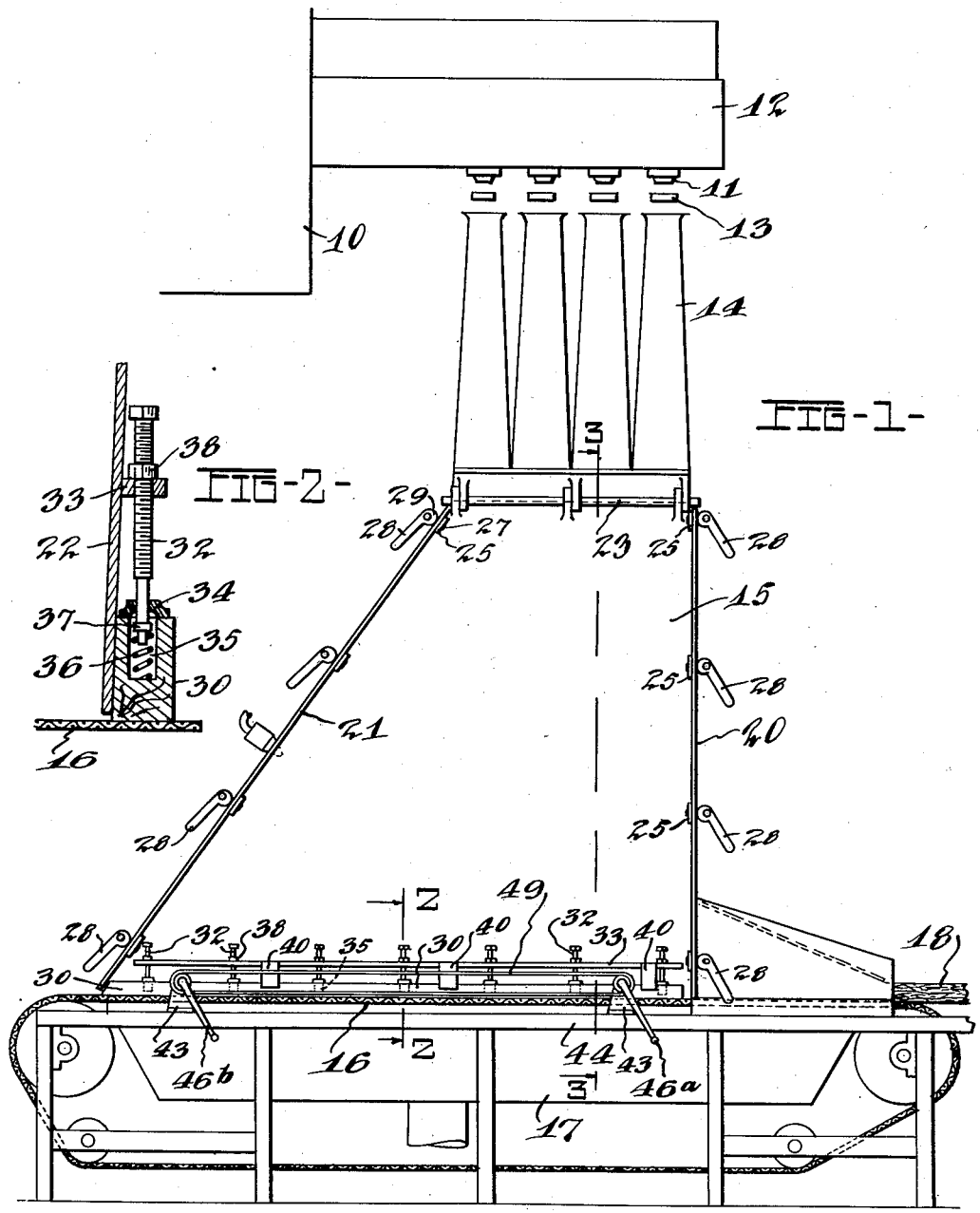

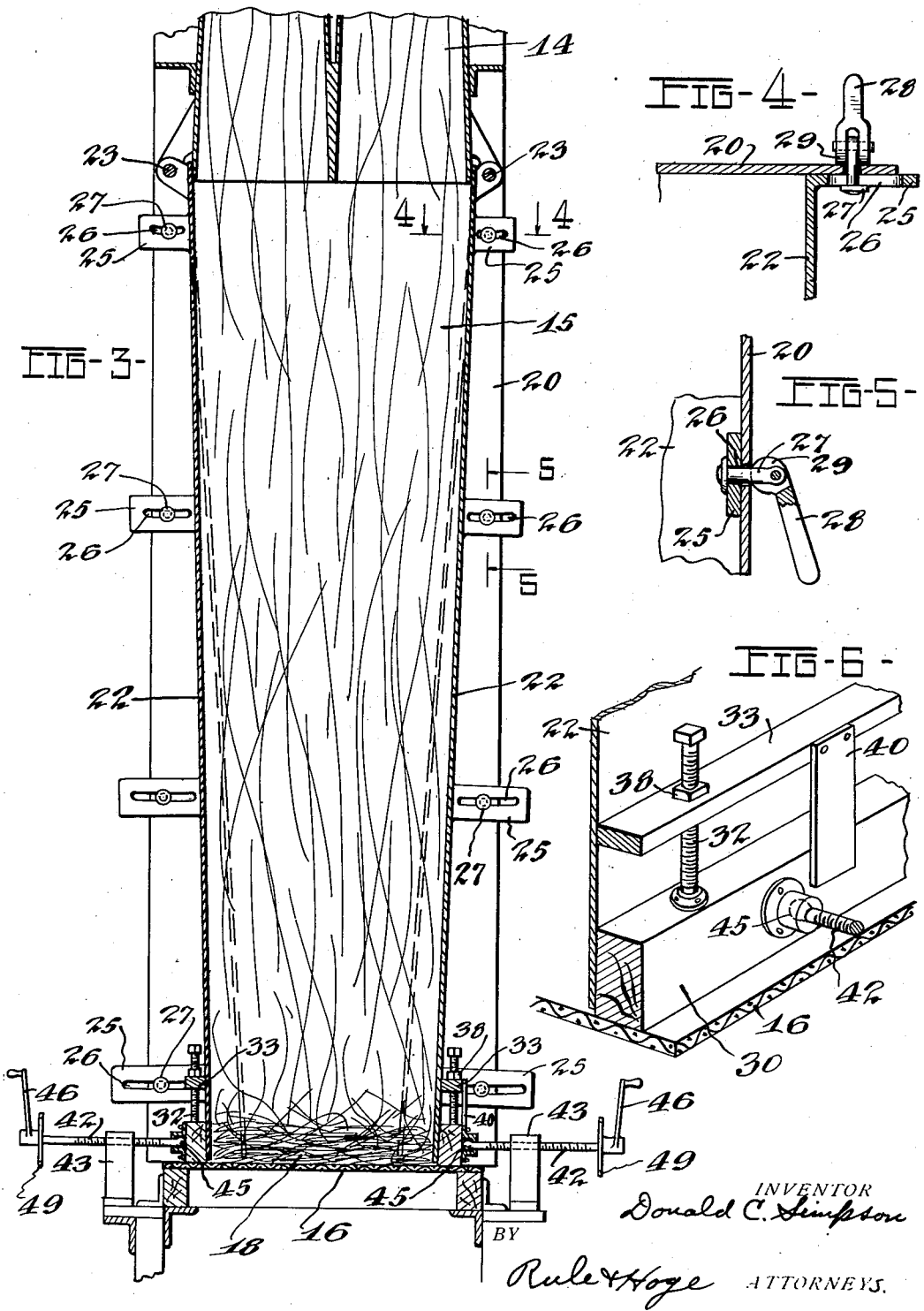

2,230,270

UNITED STATES PATENT OFFICE 2,230,270

APPARATUS FOR FORMING WEBS OF FIBROUS MATERIAL

Donald C. Simpson, Newark, Ohio, assignor, by mesne assignments, to Owens-Corning Fiberglas Corporation, Toledo, Ohio, a corporation of Delaware Application December 24, 1936, Serial No. 117,463

3 Claims. (Cl. 154—27)

My invention relates to apparatus for use in the manufacture of inorganic fibers and their fabrication into interfelted or matted form.

At the present time inorganic fibrous materials such as glass wool are extensively used for insulation and other purposes. One method of manufacturing such product comprises flowing small streams of the molten material, drawing or attenuating the streams as by means of blowers to the form of fine fibers which are conducted through a conduit or hood, and depositing the fibers on a traveling belt conveyor which moves continuously across the discharge end of the conduit or hood. The accumulating fibers are thus advanced in the form of a continuous mat.

An object of my invention is to provide novel means for adjusting the width of the conduit and thereby adjust the width of the web or mat which is being formed.

A further object of the invention is to provide in combination with the adjustable side walls of the conduit, means for providing a seal between said side walls and the traveling conveyor.

Other objects of the invention will appear hereinafter.

Referring to the accompanying drawings,

Fig. 1 is a somewhat diagrammatic side elevation view of an apparatus constructed in accordance with the present invention;

Fig. 2 is a detail view in sectional elevation, showing a sealing element, the section being taken at the line 2—2 on Fig. 1;

Fig. 3 is a sectional elevational view of the apparatus taken at the line 3—3 on Fig. 1;

Fig. 4 is a sectional detail view showing a clamp, the section being taken at the line 4—4 on Fig. 3;

Fig. 5 is a sectional view taken at the line 5—5 on Fig. 3, showing a clamp; and Fig. 6 is a detail view in perspective, showing a sealing bar and associated parts.

The apparatus herein shown is particularly adapted for making glass wool in loosely matted form. Molten glass is supplied from a furnace tank 10 and flows continuously in small streams through outlet openings in bushings 11 provided in the floor of the furnace extension or forehearth 12. Blowers 13 envelop the issuing streams of glass in downwardly directed blasts of steam or other gas by which the streams of viscous glass are drawn and attenuated to fine fibers. The fibers as they are formed are carried rapidly downward by the force of the blast through spouts 14 into a conduit or accumulating chamber 15.

An endless belt conveyor 16 continuously travels horizontally across the lower open end of the conduit 15. The conveyor is reticulated or of openwork construction to permit the free passage therethrough of the gases from the blowers, thereby facilitating the depositing and felting of the fibers upon the conveyor. A suction chamber 17 beneath the conveyor and in register with the conduit 15, facilitates the movement of the gases through the conveyor, the gases being continually exhausted from the chamber 17 and a partial vacuum maintained therein.

The conduit 15 forms a hood overlying the conveyor for confining the fibers and directing them on to the conveyor, and the fibers as they accumulate on the conveyor are carried forward to and through a suitable outlet opening in the front wall of the conduit or hood, in the form of a continuous mat 18.

The forming hood 15 comprises a vertical front wall 20, a downwardly and rearwardly inclined rear wall 21 and vertically disposed side walls 22. The side walls are mounted to swing about pivot rods 23 at their upper ends to permit adjustment of said walls toward and from each other. In this manner the width of the mat 18 which is being formed may be adjustably varied.

Means for holding the side walls 22 in adjusted position, comprise lugs 25 formed on the side walls and extending outwardly therefrom, said lugs arranged to bear against the inner faces of the front and rear walls 20 and 21 respectively. The lugs 25 are formed with arcuate slots 26, concentric with the pivot rods 23. Clamping bolts 27 extend through said slots and through openings in said front and rear walls. Clamping levers 28, pivoted to said bolts are formed with eccentric heads or cams 29 so that when the clamping levers are swung down, the lugs 25 are clamped against the adjoining walls, holding the side walls in adjusted position. When the clamping levers are swung upward, the side walls of the hood can be swung inward or outwardly to any desired position of adjustment, depending upon the desired width of the web 18.

In order to provide a seal between the lower ends of the walls 22 and conveyor 16, the following mechanism is provided. Sealing members 30, herein shown as wooden strips or bars rectangular in cross-section, are positioned at the lower ends of the side walls 22, and bear against the conveyor 16. Said sealing strips are preferably substantially coextensive in length with the lower edges of said side walls 22.

The sealing strips 30 are held in position against the side walls by means of screw rods 32 which are threaded through horizontally disposed ribs or ledges 33 affixed to the side walls. The rods 32 extend downward freely through collars 34 on the sealing strips 30 and into wells 35 in said sealing strips. Coil springs 36 within said wells bear against stops 37 on the rods. The springs 36 serve to hold the sealing strips against the conveyor belt with a yielding pressure. This pressure may be adjustably varied by adjusting the screw rods 32 up or down. Said rods are locked in adjusted position by lock nuts 38. Holding plates 40 secured to the ribs 33 and extending downward therefrom over the outer faces of the sealing strips 30, provide additional means for holding said strips against the side walls of the chute.

Mechanism for adjusting the side walls 22 includes screw-threaded shafts 42 threaded through standards 43 on the frame 44 on which the conveyor is mounted. The inner ends of the shafts 42 have swivel connections 45 with the sealing strips 30. Sufficient play may be provided in the connections 45 to accommodate any slight up and down movement of the sealing bars 30 that may be required to maintain them in contact with the conveyor belt. Hand cranks 46 are secured to the shafts 42. These cranks include front and rear cranks 46ª and 46ᵇ (Fig. 1) having a driving connection through sprocket chains 49. It will be seen that with this construction, when the clamping levers 28 are thrown up to release the clamps, the cranks 46 may be rotated to individually adjust the side walls 22 to any desired position, after which the clamping levers may be swung downward to clamp the parts in adjusted position. Owing to the sprocket chain connection 49, rotation of either crank 46ª or 46ᵇ causes an equal rotation of the other and insures an even adjustment of the side wall without distortion.

Modifications may be resorted to within the spirit and scope of my invention.

I claim:

1. The combination of a vertically disposed conduit open at the top and bottom, a horizontally disposed foraminous conveyor traveling across said lower end of the conduit and in close proximity thereto, means for blowing fibers downward through the conduit and causing them to accumulate on said conveyor, and sealing means between said conveyor and the lower edges of the side walls of the conduit, said sealing means comprising sealing strips extending lengthwise of the conveyor and bearing against the conveyor and the walls of the conduit and bridging the space between the conveyor and said walls, and springs for holding said strips downward with a yielding pressure against the conveyor.

2. The combination of a vertically disposed chute comprising front, rear and side walls, a conveyor traveling across the lower end of the chute, the side walls of the chute being pivotally mounted at their upper edges and laterally adjustable at the lower edges, clamps for holding said side walls in adjusted position and in fixed relation with said front and rear walls to provide an air seal therebetween, and means for adjusting said side walls comprising hand cranks, and screw rods connected to said side walls and actuated by said cranks.

3. The combination of means for flowing streams of molten glass, blowers for enveloping said streams in a blast of gas and drawing the streams to fine fibers, spouts having their receiving ends in proximity to said blowers through which the fibers are blown at high speed, a forming hood in register with the spouts to receive said fibers, a horizontally traveling foraminous conveyor beneath said hood on which said fibers are continually deposited and matted to form a continuously advancing web, said hood comprising side walls, means for adjusting the side walls laterally of the conveyor for adjusting the width of the web which is being formed, means for locking said side walls in adjusted position, sealing means between said side walls and said conveyor comprising sealing strips or bars bearing against the side walls and against the conveyor, and extending lengthwise of the latter, means connecting said strips to the side walls for lateral adjustment with said walls, and springs holding the sealing strips with a yielding downward pressure against the conveyor.

DONALD C. SIMPSON.